INVENTORS.
FREDERICK P. CHLANDA
HARRY P. GREGOR
KANG-JEN LIU
BY:
Arthur J. Plantamura
ATTORNEY.

United States Patent Office 3,752,749
Patented Aug. 14, 1973

3,752,749
ELECTRODIALYTIC REMOVAL OF ACID FROM AQUEOUS EFFLUENT
Frederick P. Chlanda, New Brunswick, Harry P. Gregor, Leonia, and Kang-Jen Liu, Somerville, N.J., assignors to Allied Chemical Corporation, New York, N.Y.
Filed Sept. 27, 1971, Ser. No. 183,923
Int. Cl. B01d 13/02
U.S. Cl. 204—180 P                    6 Claims

ABSTRACT OF THE DISCLOSURE

The electrodialytic concentration and removal of acids from aqueous effluents, e.g., malic acid effluent containing less than about 10% malic acid, to produce two streams, a relatively concentrated aqueous concentrate stream of about 30% acid and a relatively dilute stream of less than about 0.3% acid, is disclosed. The process, continuous, semicontinuous or batch offers a practical solution from the standpoint of meeting pollution control standards and for separating or recovering acids which may be returned to the process by direct recycling.

BACKGROUND OF THE INVENTION

In various manufacturing processes, relatively large amounts of organic acids are discharged in the effluent. While in the past such discharge has been economically tolerable, when the added expense of depolluting such effluents is added to the manufacturing costs, concentration and recycling of such acids become an important economic factor. For example, in the manufacture of malic acid, large quantities of residual malic acid are discharged in the effluent to the extent that a moderately sized plant has an effluent having an average volume of about 10,000 gallons a day and containing on the order of an average percentage of about 1.3% to 6.0% malic acid and about 0.1% to 0.3% maleic acid and 0.1% to 0.5% fumaric acid, together with lesser amounts, e.g., 10–20 p.p.m. chlorine as sodium chloride and iron in amounts of 8–19 p.p.m. Of course, acid streams with greater acid concentrations may also be treated, e.g., streams having an average concentration of malic acid from about 1.0% to about 10.0% and maleic acid in similar amounts, i.e., of 1.0% to about 10.0% Fumaric acid may be present in amounts of maximum solubility at room temperature, i.e., about 0.5%.

An effluent of this kind is a substantial pollutant to the extent that its biological oxygen demand by federal regulation must be lowered by 85% in order to comply with acceptable standards. Apart from such regulations, however, by concentrating the acid content of the stream in a plant of the above size to about 30%, a recovery of nearly one million pounds of malic acid per year would result in the over-all process. While such effluents may be processed in a conventional manner such as by use of lime and ponding in an effort to avoid stream pollution, the cost of such treatment is high, i.e., it is estimated to be more than $100,000 a year for a 10,000 gal./day effluent size plant, and no acid recovery would result from such disposition. Other treatments such as ion-exchange methods, reverse osmosis, and evaporative concentration have been suggested for treatment of said effluents; however, none of these methods have appeared suitable because of the excessive costs involved and/or because the conditions surrounding the disposition of the effluent were unsatisfactory.

SUMMARY OF THE INVENTION

The invention relates to the concentration of aqueous solutions of malic acid and of mixtures of similar acids by electrodialysis. Generally, the invention consists of treating a dilute solution of the acid, e.g., malic acid or a mixture of similar acids, in an electrodialysis cell containing alternating anion- and cation-exchange membranes. On passage of a direct current of electricity through the cell, the net transfer of acid through the membranes results in the production of two solutions of acids: one, which has a much lower concentration of acids than the starting solution; and the other, which has a much higher concentration of acids. The electrodialytic concentration can be carried out in any electrodialysis cell which would be suitable, for example, for the desalination of brackish water. A typical device for this purpose consists of a cell having suitably spaced membranes which form separate chambers. The end plates of the cell make provision for inlet and outlet of solutions being concentrated and diluted, as well as for the electrolyte for the anode and cathode chambers. Attached to each end plate is an electrode of a suitably inert material. By a series of holes and channels in the cell, the concentrate and dilute solutions are delivered to the appropriate chambers of the cell. Ports, which help seal the chambers and provide a good distribution of solution in the chambers, are inserted in channels provided for them in sealing gaskets. A cell is built up of alternating concentrate and dilute chambers and anion- and cation-exchange membranes until the desired number of diluting chambers is obtained.

The invention relates to the concentration of dilute aqueous solutions of acid and/or mixtures of acids by electrodialysis. In a particularly advantageous application, the invention involes the treatment of a dilute solution of malic acid or of mixtures thereof, or of a similar acid or mixtures thereof, in an electrodialysis cell comprising alternating anion- and cation-exchange membranes. The concentrating of the acid in the cell is effected when a direct current of electricity is passed through the cell. The electrodialysis produces a net transfer of acid through the membranes yielding two solutions of acids: one of which has a much lower concentration of acid than the starting solution and the other of which has a much higher concentration of acid. The electrodialytic concentration of malic and similar acids may be carried out as a batch or as a semi-continuous or a continuous process.

In the batch process, the concentrate and the dilute streams are charged with appropriate amounts of a solution of the acid, i.e., the effluent. The volumes of each stream are chosen so that when the dilute stream reaches a very low concentration the concentrate will have the desired concentration. The electrodialysis process is continued until the acid concentration of the dilute stream reaches a desired low level. The dilute stream, which has now been depleted of most of its acid values, can be discarded or used for its water values. The concentrate can be used for further concentration and isolation of the acids or for any use that requires a concentrated acid solution.

The semi-continuous process takes advantage of the fact that water is transported through the membranes with the acid. The dilute stream remains the same as for the batch process while the concentrate reservoir is replaced with a reservoir which has an overflow so that any tendency for an increase in volume of the concentrated stream causes the reservoir to overflow into a collection vessel.

Thus, a constant stream of concentrated solution is produced.

In the continuous process, the concentrated stream is processed essentially in the same manner as in the semicontinuous process as will be described in greater detail hereinafter.

Figure 2:
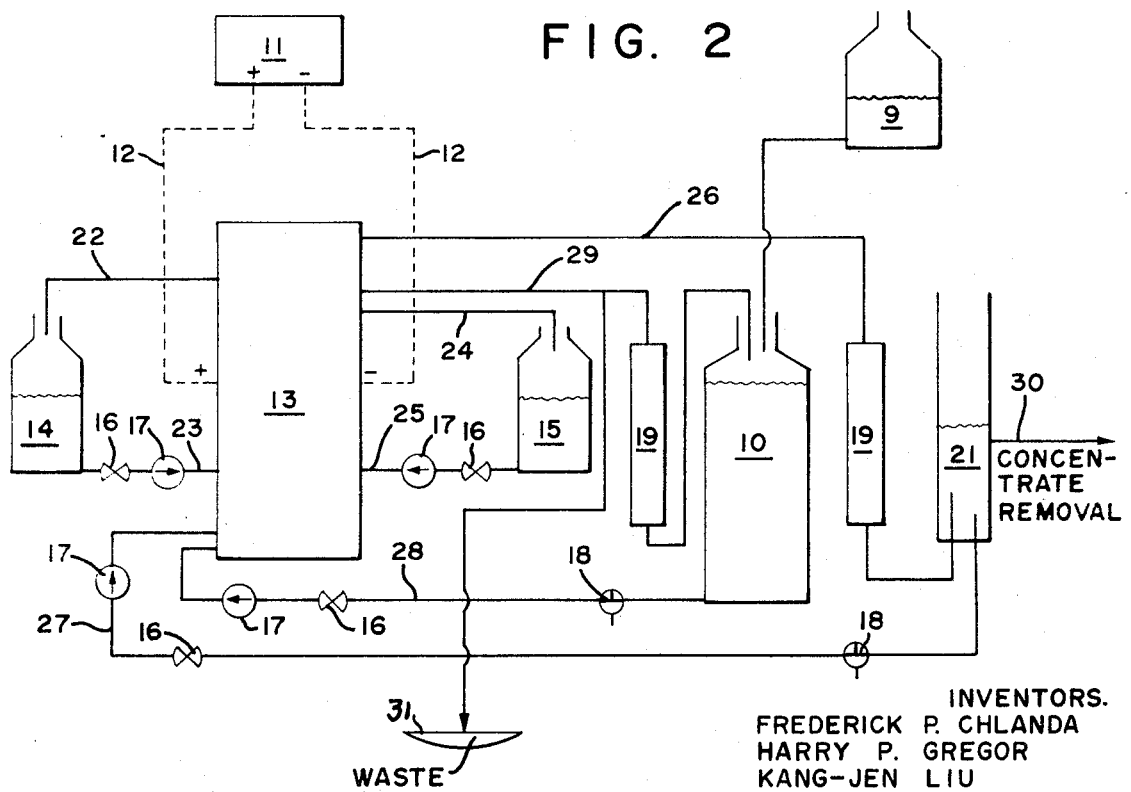
FIG. 2 illustrates schematically a suitable electrodialysis system including the cell, reservoir, heat exchanger, power source, and related components to provide an operable system.

By reference to FIG. 2, a continuous process is described. An electrodialytic cell 13 is supplied with electricity from a direct current power source 11. The cell 13 is supplied with anolyte and catholyte from reservoirs 14 and 15, respectively. The reservoir of dilute acids to be concentrated is shown at 9 and the reservoir of the concentrated acid at 21. Suitable heat exchangers 19 are employed to control the temperature of both the concentrate and the dilute streams exiting from cell 13 at 26 and 29, respectively. A solution is introduced from 9 into dilute reservoir 10 which is more concentrated than the dilute solution, i.e., than the solution which is exiting from cell at 29 and treated as the discard. The concentration of the solution at 10 is such that a single pass through cell 13 will give the acid-depleted effluent the relatively lower concentration acceptable for disposal. The initial solution 9 is added to the dilute reservoir 10 from the source, e.g., the malic acid plant effluent, at such a rate that the concentration in reservoir 10 does not change. A portion of the dilute stream 29 exiting from cell 13 is removed and disposed of at 31 while the remainder of the solution at 29, after passing through heat exchanger 19, is returned to reservoir 10. Along with the solution removed from and returned to the cell at 28 and 29, respectively, the effluent feed is adjusted to maintain a constant volume of solution in dilute reservoir 10. The concentrate withdrawn, as shown by stream 30, is returned to the plant at a rate which keeps the volume of solution in reservoir 21 constant.

When mixtures of acids are concentrated—particularly when mixtures containing fumaric acid are concentrated—care must be taken to ensure that a precipitate of the acid does not form in electrodialysis cell 13 itself. The precipitate can block the chambers of the cell or form on or within the anion-exchange membranes causing a rapid deterioration of the performance of the process and eventual destruction of the usefulness of the anion-exchange membranes. The concentration of acids of relatively low solubility can be controlled by maintaining an elevated temperature within the electrodialysis cell thereby increasing the solubility of the acid. Where the acid is present in such a concentration that its concentration during the process does not exceed the solubility at the temperature chosen, no further treatment is necessary. However, if the amount of sparingly soluble acid that results during the concentration or in the ultimate concentrate is greater than the solubility of the acid at that temperature, it is necessary to continuously, or at least periodically, remove this acid from the concentrate stream 26 by cooling the concentrate to precipitate the sparingly soluble acid which can then be removed by filtration.

The process of the invention, while particularly advantageous for separation of relatively weak acids from effluent, may also be employed in the separation of weak acids from strong acids such as hydrochloric acid. The low ionization of most organic acids in aqueous solution allows these acids to be separated from strongly ionized acids by electrodialysis using the same techniques as for concentration. In a mixed aqueous solution of a strongly ionized acid and a weakly ionized acid, the stronger acid will be more highly dissociated than the weaker acid first of all because of the weakly acidic character of the weaker acid and secondly because of the increased hydrogen ion concentration caused by the dissociation of the strong acid. These two factors cause the ionic composition of the solution to consist nearly entirely of ions of the strong acid. When a current is passed through the solution, the current will be carried by the ions of the strong acid. A further basis for the separation of the two acids is the relative mobilities of their anions in the anion-exchange membrane. Thus, while separation will occur when any anion-exchange membrane is employed, better results can be obtained with selective membranes such as ASV membrane available from Asahi Glass Company.

If the mixed strong and weak acids are placed in the diluting chambers of the electrodialysis stack and a current is passed through the stack, the strong acid will move to the concentrating chambers leaving the weak acid in the diluting chambers. The process can be carried out until the desired degree of separation is achieved or until the acids migrate in the same proportions as they are found in the diluting chambers, after which no further separation can be achieved.

Figure 1:
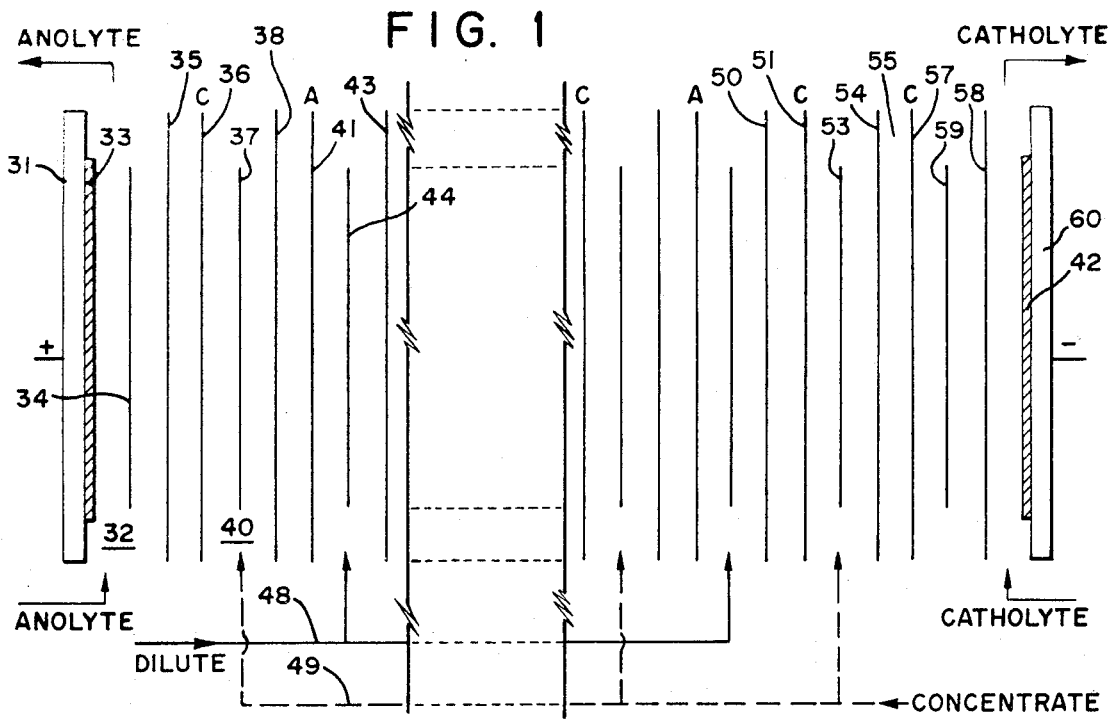
FIG. 1 illustrates schematically the arrangement of an electrodialysis cell which may be used to concentrate the acid.

An electrodialysis cell of the kind that may be employed in treating the acids is illustrated in FIG. 1. The letter A designates anion-exchange membranes; C designates cation-exchange membranes. The cell is assembled by placing electrode chamber gasket 35 on anode plate 31 containing anode 33 to form anolyte chamber 32. Spacer 34 is placed in the chamber 32; then a cation-exchange membrane 36 is placed on the gasket 35. Gasket 38, which allows flow of concentrate through the chamber 40, is placed on membrane 36. Spacer 37 is placed in chamber 40 formed by gasket 38 and membrane 36. An anion-exchange member 41 is placed on top of gasket 38. Gasket 43 is placed on this membrane which allows flow of the dilute solution through this chamber. The solid line 48 designates the flow of dilute solution flowing to the several diluting chambers; the broken line 49 designates the flow of concentrate solution flowing to the several concentrating chambers. The processed streams are similarly removed from the top (not shown). Ports and passageways are appropriately formed in the gaskets and end plates to permit the liquid being tested to pass in a conventional manner.

The cell is built up of alternating concentrate and dilute chambers and anion- and cation-exchange membranes until the desired number of diluting chambers is reached. At the cathode end of the cell, a cation-exchange membrane 51 is placed on the gasket 50; a gasket 54 which allows concentrate to flow to chamber 55 is placed on membrane 51 and spacer 53 is inserted. Thereafter, another cation-exchange membrane 57 is placed on gasket 54. Electrode chamber gasket 58 is placed on top of this membrane 57 and spacer 59 is inserted. Finally, cathode end plate 60 is attached and the stack is tightened by means of bolts and brackets (not shown) placed over the end plates to provide a tight seal. The end plate of the stack may consist of a rigid sheet of polypropylene or other inert insulating material and has holes drilled through in a conventional manner to align with the holes of the gaskets to provide for the input and output of the anolyte, catholyte, concentrate and dilute streams. A suitable electrical connection is made to the electrode which is mounted on the end plate. There are two end plates of similar construction, one at each end of the stack. The streams are introduced and exit from the cell in a conventional manner with flow occurring from the bottom to the top of the stack through the concentrate and dilute chambers. The electrolyte solution is fed into the bottom of each end plate and out the top in the same end plate since these solutions only circulate in the end (electrode) chambers of the stack.

The cation- and anion-exchange membranes can be any of the well known strong acid and base types manufacture by AMFion Company, Asahi Glass Co., Ltd., or any membrane having a fixed ionic charge and exhibiting ion permselectivity. For example, the cation-exchange membrane consists of a homogeneous sheet of insoluble ion-exchange material containing sulfonic acid groups or a supporting matrix impregnated with a similar material; the anion-exchange membrane consists of a homogeneous sheet of insoluble ion-exchange material containing quaternary ammonium groups or of a material of a similar nature embedded in an inert matrix. The performance of the process depends to a certain extent upon the membranes that are selected, particularly upon the nature of the anion-exchange membrane used. The particular performance factors involved are the current efficiency and the ultimate concentration of the concentrated solution produced.

Electrodes used in the cell can be any which are inert to the solutions in the anode and cathode chambers under the electroditalysis conditions. Common electrode materials for the cathode include carbon, platinum or stainless steel, and for the anode, platinum or carbon, for example.

In addition to the electrodialysis cell, other equipment is required which includes a source of DC electricity sufficient for the needs of the process; pumps with a capacity to give a flow through the cell high enough to combat concentration polarization; reservoirs for the concentrate, dilute and electrode solutions; heat exchangers to achieve and maintain the desired temperature; filters for the removal of solids; and other apparatus which might be necessary for the convenient operation of the process.

EXAMPLE 1

An electrodialysis cell of the design described previously was used. The electrodes of the cell were carbon sheets 4" x 8" x ¼" thick. The gaskets were made from 50 durometer neoprene having a thickness of 1.5 mm., and the spacers were a polypropylene mesh (Du Pont Vexar). Ports 1.22 mm. thick were fabricated from polypropylene. The channel through the ports was about 0.8 mm. thick. The cell was assembled as previously described using six cation-exchange membranes comprising polyethylene film containing sulfonic acid polyelectrolyte and four anion-exchange membranes comprising polyethylene films containing quaternized amine polyelectrolytes (AMF C–100 and AMF–100 membranes), respectively, of American Machine and Foundry Company. The exposed membrane area for each membrane was 8¼" x 4⅞". In all, there were four chambers in which dilute solution flowed and five chambers which contained concentrate.

The cell was equipped with two 2-liter reservoirs and centrifugal pumps for the anode and cathode solutions (FIG. 3). The reservoir for the dilute stream was an 8-liter polyethylene aspirator bottle and for the concentrate the reservoir was a 2"-dia. glass pipe mounted vertically and fitted with a two-hole stopper at the bottom allowing the input and output to be made. The volume of the concentrate stream filled to a reference point in the concentrate stream was previously determined. The concentrate reservoir was also calibrated so that the volume of the concentrate stream could be determined by noting the difference in the liquid height from the reference mark. The dilute and concentrate streams were circulated from the reservoir, through the cell, back to the reservoir by means of centrifugal pumps. The anode stream was filled with 1 liter of 5% $H_2SO_4$ and the cathode stream with 1 liter of 5% malic acid. The dilute stream was filled with 8 liters of 5% malic acid, available as Pomalus acid, Allied Chemical Corporation.

Small samples of each stream were taken for titrimetric determination of malic acid. The concentration of both the concentrate and the dilute streams was 0.37 M and the volumes of the dilute and concentrate streams were 8 liters and 875 milliliters, respectively. The rate of flow was adjusted to give a 0.5 cm. difference in the inputs to the cell, the higher pressure being on the concentrate side. The flow rate of the dilute stream was 1 liter a minute. Both the concentrate and the dilute streams flowed through glass heat exchangers so that a constant temperature of 25° could be maintained during the electrodialysis process.

After passing a DC current of 10 amperes through the cell for 10,000 seconds, the volume of the concentrate stream had increased to 1380 ml. The concentration of malic acid in the concentrate stream had increased to 1.66 M, while the concentration in the dilute stream had decreased to 0.11 M.

EXAMPLE 2

The apparatus of Example 1 was employed, except that the anion-exchange membranes were AMF A–104 and the cation-exchange membranes were AMF C–103 and the 8-liter bottle used as the dilute reservoir was replaced with a 20-liter polyethylene aspirator bottle.

Fifteen liters of 5% malic acid was placed in the dilute stream and 400 ml. in the concentrate stream. Analysis showed the concentrate and dilute streams to be 0.36 M and 0.37 M, respectively. After passing a current of 10 amperes for 20,000 sec. through the cell, the volume of the dilute stream had increased to 1600 ml. The final concentration of the concentrate and dilute streams was 2.34 M and 0.045 M, respectively.

EXAMPLE 3

The apparatus used was that of Example 1 with 1 liter of 1% phosphoric acid as the anode solution and 1 liter of 5% malic acid as the cathode solution. The concentrate and dilute chambers were filled with a filtered waste solution from a malic acid producting plant. The solution was 0.46 M in diacid consisting of fumaric (0.017 M), maleic (0.07 M), and malic (0.37 M). In addition the solution contained unknown color bodies which imparted a yellow color to the solution. Initially, the dilute stream contained 8 liters of solution 0.46 M. in diacid and the concentrate stream contained 500 ml. of solution 0.130 M in diacid. The solution flow was adjusted as in Example 1. The temperature of the solution was raised to 50° and maintained at this temperature while a DC current of 10 amperes was passed for 1 hour. At the end of this period, the concentrate, whose volume was 770 ml., was drained from the cell and the concentrate stream was filled with warm water. The diacid concentration of the dilute stream was 0.34 M and of the concentrate solution 1.45 M. The concentrate was cooled to 8° and the fumaric acid precipitate (3.3 g.) was filtered off. The water was drained from the concentrate stream and 500 ml. of the fumaric acid-free concentrate was placed in the concentrate stream. The diacid concentration of the concentrate was 1.01 M while that in the dilute was 0.22 M. A DC current of 10 ampéres was passed while the solution temperatures were maintained at 50° for 1 hour. The concentrate (920 ml. of 1.65 M) was drained from the cell, replaced with warm water, and cooled to 8°. The fumaric acid precipitate weighing 4.3 g. was filtered off and 500 ml. of the concentrate was returned to the cell. The concentration of the concentrate was 1.35 M and of the dilute 0.22 M. Electrodialysis was continued for 1 hour at 50°. The concentrate contained 800 ml. of 1.76 M diacid solution while the concentration of diacid in the dilute had fallen to 0.108 M. The concentrate was drained and replaced with warm water. The dilute was drained and 8 liters of fresh diacid solution 0.45 M was added. The concentrate was cooled to 8° and 1.2 g. of precipitated fumaric acid was removed by filtration. The water in the concentrate stream was replaced with 500 ml. of fumaric acid-free concentrate 1.48 M in diacid. Electrodialysis was continued at 10 amp. DC current for 1 hour at 50°. At the end of this time, the concentration of diacid in the concentrate (830 ml.) was 2.02 M and the concentration of diacid in the dilute was 0.31 M. The concentrate when cooled yielded 5.8 g. of solid fumaric acid. The electrodialysis cell was opened. The membranes did not exhibit any evidence of fouling by fumaric acid. The performance of the membranes, after this run in concentrating malic acid solutions, was essentially unchanged from their performance prior to the experiment indicating that no degradation of their properties had occurred handling fumaric acid concentrations which would have rendered the membranes essentially useless at lower temperatures or at higher temperatures if the fumaric acid concentration had been allowed to increase to the saturation level.

EXAMPLE 4

A solution 0.96 M in malic acid and 0.085 M in hydrochloric acid was placed in the diluting chamber and a solution 0.1 M in hydrochloric acid was placed in the concentrating chambers of an electrodialysis cell assembled as follows: anode, anolyte (2% $H_2SO_4$) chamber, AMF C–100 membrane, concentrate chamber, Asahi Glass Company ASV membrane, dilute chamber, AMF C–100 membrane, concentrate chamber, AMF C–100 membrane, catholyte (2% $H_2SO_4$) chamber, and cathode. The circular membranes had an area of 10 cm.$^2$. After passing a direct current of 0.3 ampere for 1000 sec., the concentration of $Cl^-$ in the diluting chamber decreased to 0.057 mole/liter while the concentration of malic acid remained virtually unchanged. The current efficiency based upon the amount of $Cl^-$ transferred was 100%. The results of this run demonstrate that hydrochloric acid can be nearly quantitatively separated from malic acid even when the concentration of malic acid is more than ten times greater than the concentration of hydrochloric acid.

In a similar manner, aqueous solutions containing mixtures of other relatively strong acids, e.g., sulfuric, phosphoric, nitric, and the like, with weak acid such as acetic, adipic, citric, and the like, may be effectively separated.

While the invention has been described herein with reference to various preferred embodiments and specific examples, it will be understood that variations from the details provided can be made without departing from the essence of the inventive contribution.

We claim:

1. A process for concentrating dilute aqueous solutions containing below about 10 percent by weight malic acid which comprises passing said solution into an electrodialysis cell through which a direct current is passed and which consists essentially of anode and cathode compartments with intermediate compartments separated alternately by anion- and cation-permeable membranes and effecting concentration of the acid by the movement of ions through said membranes.

2. A process for concentrating and separating a mixture of malic and fumaric acids from a dilute aqueous solution which comprises passing a direct current through an electrodialysis cell containing said solution, said cell comprising a plurality of compartments separated alternately by anion- and cation-permeable membranes, cooling at least a portion of the aqueous acid concentrate and separating the fumaric acid precipitate from the cooled malic acid solution.

3. A process for concentrating dilute aqueous solutions containing below about 10 percent by weight maleic acid which comprises passing said dilute solution into an electrodialysis cell consisting essentially of anode and cathode compartments with intermediate compartments separated alternately by anion- and cation-permeable membranes and effecting separation of the acid through said membranes by passing direct current through said cell.

4. A process for concentrating and separating a mixture of maleic and fumaric acids from a dilute aqueous solution which comprises passing a direct current through an electrodialysis cell containing said solution, said cell comprising a plurality of compartments separated alternately by anion- and cation-permeable membranes, and cooling at least a portion of the aqueous acid concentrate and separating the fumaric acid precipitate from the cooled maleic acid solution.

5. A continuous process for concentrating and separating a mixture of malic and fumaric acids from a dilute aqueous solution which comprises passing a direct current through an electrodialysis cell containing said solution, said cell comprising a plurality of compartments separated alternately by anion- and cation-permeable membranes, cooling at least a portion of the aqueous acid concentrate and separating the fumaric acid precipitate from the cooled malic acid solution, passing continuously into said cell a malic acid effluent containing from about 1.3% to 6.0% average concentration of malic acid and withdrawing (a) a relatively concentrated stream of malic acid and (b) a stream relatively depleted in malic acid.

6. A continuous process for concentrating and separating a mixture of maleic and fumaric acids from a dilute aqueous solution which comprises passing a direct current through an electrodialysis cell containing said solution, said cell comprising a plurality of compartments separated alternately by anion- and cation-permeable membranes, cooling at least a portion of the aqueous acid concentrate and separating the fumaric acid precipitate from the cooled maleic acid solution, passing continuously into said cell a maleic acid effluent containing from about 1.3% to 6.0% average concentration of maleic acid and withdrawing (a) a relatively concentrated stream of maleic acid and (b) a stream relatively depleted in maleic acid.

References Cited

UNITED STATES PATENTS

| | | | |
|---|---|---|---|
| 2,694,680 | 11/1954 | Katz et al. | 204—151 X |
| 3,030,287 | 4/1962 | Schulz | 204—151 |
| 3,165,415 | 1/1965 | Kilburn et al. | 204—180 PX |
| 3,244,620 | 4/1966 | Hansen et al. | 204—180 P X |
| 3,479,267 | 11/1969 | Rajan et al. | 204—180 P |

OTHER REFERENCES

Wilson, "Demineralization by Electrodialysis," pp. 33–37, TD 433 PT C. 2 (1960).

Lightfoot et al., "Ion Exchange Membrane Purification of Organic Electrolytes," Indust. and Engin. Chem., pp. 1579–83, August 1954.

JOHN H. MACK, Primary Examiner
A. C. PRESCOTT, Assistant Examiner